United States Patent Office 2,906,599
Patented Sept. 29, 1959

2,906,599

METHOD OF PREPARING SODIUM CHLORIDE BRINES OF HIGH PURITY

Charles T. Roland, Bridgeville, Pa., assignor, by mesne assignments, to Hagan Chemicals & Controls, Inc., a corporation of Pennsylvania No Drawing. Application November 16, 1953
Serial No. 392,524

20 Claims. (Cl. 23—42)

This invention relates in general to a method of preparing sodium chloride brines which have an unusually high degree of purity, and in particular to the preparation of brines made from dry mined rock salt and subsequently used in certain industrial processes and in the manufacture of industrial chemicals.

Sodium chloride (NaCl) is one of the most important basic raw materials used by industry today. This is particularly true in the case of the chemical industry since it is the primary source of metallic sodium and chlorine gas as well as numerous other compounds of these elements, such as caustic soda, soda ash, sodium chlorate, etc. Sodium chloride is obtained chiefly from natural deposits which are mined dry as rock salt, or dissolved in aqueous solutions as salt brine. Rock salt is essentially an impure form of sodium chloride and occurs in various underground strata. Although sodium chloride is obtained from other sources than rock salt—such as from the evaporation of sea water, etc.—by far the largest amount of this important chemical is obtained from underground deposits of rock salt. The principal commercially mined strata of rock salt in the United States are found in the States of Texas, Louisiana, Michigan, Kansas, and New York, although the material is widely distributed throughout other areas.

Rock salt is an impure form of sodium chloride and the impurities must be removed where a pure form of sodium chloride is desired for industrial purposes. It is usually unnecessary to purify rock salt when it is to be used for refrigeration brine, melting of ice and snow, etc. but virtually all rock salt which is used as a chemical raw material must be purified beforehand, for reasons which will be apparent to those skilled in the art.

The mineral impurities found in rock salt are anhydrite (calcium sulfate), dolomite (calcium magnesium carbonate), and quartz (silicon dioxide). Lesser amounts of other compounds of iron, calcium, and magnesium are also present such as iron oxide, calcium chloride, and magnesium chloride. The major and most objectionable impurity is calcium sulfate ($CaSO_4$) which occurs in virtually all the natural salt deposits in the earth. In crude rock salt as mined, calcium sulfate is found in amounts ranging from about 1% to 3% by weight. The minor impurities are variable in amount depending on the particular strata, and generally total less than 0.5% by weight. The principal minor impurity is quartz (silica). It is interesting to note that in the so-called southern rock salt, i.e. from Texas and Louisiana, the calcium sulfate or anhydrite is usually present in coarse grains, easily visible to the eye, and appearing like fine, clear, or white sand. In the New York state salt, the anhydrite is present in somewhat finer grains, most of them visible and of a sparkling brown or black color, probably due to iron coloration. In the Michigan salt, the anhydrite may vary in color from dark brown to a buff or yellowish-white color.

The chemical industry uses enormous quantities of salt, principally in the electrochemical manufacture of caustic soda, chlorine and related products, and in the manufacture of metallic sodium. It is particularly in these electrolytic processes that a high degree of purity of the sodium chloride brine is of vital importance. In the manufacture of caustic soda and chlorine by the electrolysis of a sodium chloride brine, the presence of calcium sulfate is recognized as being highly detrimental to efficient operation of the electrolytic process. The presence of calcium ion results in plugging of diaphragms while the sulfate ion accelerates the erosion or oxidation of the graphite electrodes. Frequent replacement of electrodes is undesirable not only from the cost standpoint but also in view of the shut-down time which is entailed. Furthermore the sodium sulfate which builds up in the recycled sodium chloride brines of present day practice must be periodically removed by an expensive refrigeration process because even a slight lowering of the sodium chloride content of the cell feed brine from the point of saturation leads to a significant increase in the rate of graphite anode attack, the anode attack rising rapidly as sodium chloride concentration decreases.

In the manufacture of metallic sodium and chlorine by the electrolysis of molten sodium chloride, an extremely high degree of purity of the sodium chloride is required because sulfates and other impurities in the molten salt attack and destroy the graphite electrodes and the furnace refractories. These electrolytic processes are also virtually continuous so that rapid deterioration of the electrodes must be avoided to maintain high production schedules.

In addition to the extensive use of salt in the electrochemical manufacture of caustic soda, chlorine, and metallic sodium, huge quantities of sodium chloride are consumed in the ammonia-soda process for the manufacture of soda ash ($Na_2CO_3$). Here too, the calcium sulfate impurity present in the sodium chloride brine interferes with the efficiency of the process due to the deposition of insoluble calcium compounds.

When salt is used in many of the dyeing processes in the textile industry, it is essential to keep the concentration of calcium ion at a minimum, otherwise uniform application of the dye to the fabric is often rendered virtually impossible of attainment.

To prepare rock salt for most chemical manufacturing uses, the crude rock salt is dissolved in water to form a brine. The brine may either be used directly in the manufacturing process as in the electrolytic process for making caustic soda and chlorine, or the water in the brine may be evaporated to leave a residuum of sodium chloride which is then employed as a solid material, as for instance in the manufacture of metallic sodium. While certain users of brine may locate their plants strategically in an area where salt deposits in the earth are immediately accessible, others purchase mined rock salt, dissolve it to make a brine, and utilize the brine in their particular processes. In the case of a plant located above or near a deposit of salt beneath the earth's surface, water is pumped or flowed into contact with the impure salt and the resultant brine is returned to the surface. In those manufacturing plants where salt deposits are not adjacent, crude rock salt is mined, crushed and graded, shipped to the plant, and dissolved in large tanks in water. In either case, the brine is substantially a saturated aqueous solution of sodium chloride which without purification will contain the above mentioned impurities.

Calcium sulfate ($CaSO_4$), the most objectionable impurity in native rock salt, is soluble in cold water and sodium chloride solutions, so that as a given weight of crude salt dissolves, there is a concomitant dissolution of calcium sulfate and the brine thus prepared is actually a solution mixture of sodium chloride, calcium sulfate, and lesser amounts of the other soluble impurities. In many instances the cost of purification of the brine to remove calcium ion and sulfate ion was prohibitive and the presence of one or both of these impurities was tolerated. However, where calcium sulfate could not be tolerated, several methods of purification have been adopted with varying results.

For many years it had been the usual practice where a pure brine was required, to prepare the brine by first dissolving the crude salt along with its impurities in water, followed by the addition of various reagents to the brine so that these objectionable contaminants were precipitated. Calcium was usually precipitated as calcium carbonate by the addition of an alkali metal carbonate such as soda ash ($Na_2CO_3$), leaving the soluble sodium sulfate reaction product in solution as a contaminant in the brine. Magnesium was precipitated by the use of alkali metal hydroxides such as caustic soda (NaOH), and finally the sulfate radical ($SO_4$) which is the most costly ion to remove, was precipitated as barium sulfate by the addition of a water soluble barium salt such as barium chloride (BaCl) or barium nitrate ($BaNO_3$). In each of these precipitation processes, coagulation, settling, or filtering operation is required to rid the brine of the resultant precipitates before use and such steps often proved more costly than the toleration of the impurity. In those cases where the calcium only was removed from the impure brine before electrolysis, the sodium sulfate remaining could only be tolerated for a time without disastrous results because it soon crowded out the sodium chloride in recycled brines. To cope with this build up of sodium sulfate, it was necessary to discard large quantities of the impure brine or utilize the aforementioned refrigeration process to rid the brine of the sodium sulfate.

An improvement over these after-precipitation methods is disclosed in U.S. Patent 2,433,601 where a brine is prepared by pre-addition either to the water used in dissolving the salt, or to the salt itself, of a small amount of an alkali-metal carbonate or an alkali-metal orthophosphate, i.e. trisodium phosphate. These compounds all react with the calcium sulfate and other calcium compounds to form water insoluble precipitates of calcium carbonate, calcium phosphate, etc. The precipitated materials must be separated subsequently from the brine, and the sodium sulfate which is in solution in the brine must be removed by one or more of the costly processes described hereinbefore, i.e. use of barium salts, refrigeration, etc.

In accordance with my invention, I have discovered a method of preparing pure sodium chloride brines from crude salt. These brines are so low in calcium sulfate content that the costly purification steps heretofore required are no longer necessary.

An object of my invention is to provide an improved method of producing a pure brine from crude sodium chloride containing calcium sulfate as an impurity, said pure brine being substantially free of sulfate.

A still further object of the invention is to provide a method of obtaining a sodium chloride brine of high purity from crude sodium chloride in which I employ inhibiting agents to prevent the solution of the calcium sulfate by physical and/or chemical means which are not entirely understood.

Further objects will appear from the detailed description which follows herewith.

The novel processes which I have discovered involve the use of a group of phosphates that I have denominated as polyphosphates, which under the conditions of use in these processes do not react with calcium sulfate and other calcium salts to precipitate insoluble calcium compounds from the brine as do the phosphates and other brine purifying compounds of the prior art. This unique behavior of the polyphosphates in this particular application is of great importance since it makes it possible to utilize my novel development in many opeartions which heretofore could never secure beneficial results through the use of the alkaline orthophosphates and carbonates, etc. because of the attendant precipitation of calcium salts from the brine and the plugging of passageways, screens, and other restricted areas thereby.

It will also be noted from the description which follows that I am able to use extremely minute quantities of my preferred materials and still obtain a brine of very high purity. In other words, I am able to operate with an entirely different type of additive and at concentrations which are far below the minimal amounts required when the "precipitating" type of materials are used.

It will be further noted that I may use my preferred methods even in an acidic environment, as for example when it is desired to saturate a weak sodium chloride brine which contains hypochlorous acid or other acid-reacting contaminants, or when it is necessary to prepare a pure brine using water which is inherently acidic, that is where the pH value is below 7.0. Heretofore those methods which depend upon precipitation of insoluble calcium compounds at pH values above 7.0 could not be used effectively under these conditions.

In carrying out my novel method of preparing a brine of high purity, I form the brine by dissolving rock salt or any other impure form of sodium chloride in the presence of a very small amount of polyphosphate compound. By polyphosphate compound I mean any one or more of those crystalline or glassy compounds which may be considered to have been derived from orthophosphoric acid or acid orthophosphates by molecular dehydration. I prefer to employ the sodium polyphosphates due to their lower cost, but I may use the potassium, lithium, ammonium, or acid polyphosphates or mixtures of these compounds.

By polyphosphate compound I mean to include those which are soluble in water and more particularly the alkali-metal and the ammonium polyphosphates. The term polyphosphate compounds includes the metaphosphates, the tetraphosphates, the pyrophosphates, the tripolyphosphates, as well as various other complex phosphates and mixtures of two or more of these phosphates.

The sodium and the acid sodium polyphosphates such as the pyrophosphates ($Na_4P_2O_7$) and ($Na_2H_2P_2O_7$), the tripolyphosphate ($Na_5P_3O_{10}$), the tetraphosphate ($Na_6P_4O_{13}$), the hexametaphosphate ($NaPO_3)_6$ and an infinite number of the other complex polyphosphates are derived by the molecular dehydration of orthophosphoric acid compounds and are frequently defined as "molecularly dehydrated phosphates." Of these various polyphosphates, the hexametaphosphate or metaphosphate as it is often called, is known most commonly as a glassy material as is the tetraphosphate, and consequently these materials are often called "phosphate glasses" or "glassy phosphates." The tripolyphosphates as well as the pyrophosphates are known only as crystalline rather than glassy materials. The acid polyphosphates are known both as crystalline and glassy materials.

In view of the fact that most of the polyphosphate compounds commercially available exist in the form of the sodium salt such as sodium tripolyphosphate, sodium hexametaphosphate, sodium tetraphosphate, etc., I prefer to employ the sodium compounds in my process but I do not intend to limit myself to this particular alkali metal salt since the potassium polyphosphate compounds as well as the amonium polyphosphate compounds and mixtures thereof are quite suitable for my purposes. Generally speaking, I can employ any of these molecularly dehydrated phosphates to advantage regardless of the ratio of alkali metal oxide ($M_2O$) to phosphorus pentoxide ($P_2O_5$) but I prefer to use the readily available materials falling in the range of about $1M_2O$ to $1P_2O_5$ up to about $2M_2O$ to $1P_2O_5$ or in other words within the system, for example, sodium metaphosphate ($NaPO_3$) to sodium pyrophosphate ($Na_4P_2O_7$).

While it is preferable to use the water soluble salts such as sodium hexametaphosphate or sodium tripolyphosphate, etc., I may use some of the virtually insoluble salts which can be solubilized under certain conditions, i.e. those materials commonly called "water insoluble polyphosphates." A description of these materials as well as a method for rendering them soluble will be found in U.S. Patent 2,405,276 granted on an application filed by Ambrose George Taylor. It will be obvious to those skilled in the art that since I am using my polyphosphate compounds in aqueous solutions containing sodium chloride, the insoluble potassium, lithium, ammonium, and rubidium polyphosphates will be solubilized by the sodium ion in the solution as well as by any magnesium or calcium ions present, in accordance with the teachings of the Taylor patent.

In addition to using the water soluble polyphosphates and the lesser known water insoluble polyphosphates, I may employ to good advantage the slowly soluble glassy polyphosphates which are generally a mixture of an alkali metal oxide, an alkaline earth metal oxide, and phosphorus pentoxide as described extensively in U.S. Patents 2,370,472, 2,370,473, and also 2,601,395. These slowly soluble complex polyphosphates have been used widely in the water treatment art but hitherto have not been employed for preparing pure sodium chloride brines. They are particularly adaptable to my process when relatively small batches of brine are to be prepared although they may in any case be employed no matter how extensive the operation and no matter whether the brine is being prepared in batches or in a continuous process. Insofar as the slowly soluble glassy phosphate compositions are applied to my brine purification process, I do not wish to be limited to any particular combination of component oxides since I have found that any of those which inhibit the precipitation of calcium from water are effective. The basic composition of these slowly soluble glassy phosphates may be graphically illustrated on triangular coordinate charts and have the following ingredients:

(1) Phosphorus pentoxide ($P_2O_5$)
(2) Alkali metal oxide such as sodium oxide ($Na_2O$), potassium oxide ($K_2O$), lithium oxide ($Li_2O$)
(3) Metal oxide such as magnesium oxide (MgO), calcium oxide (CaO), strontium oxide (SrO), barium oxide (BaO), aluminum oxide ($Al_2O_3$), iron oxide ($Fe_2O_3$), etc.

Methods of manufacturing these slowly soluble polyphosphates are to be found in the several patents referred to earlier.

In carrying out my process, the brine is formed by dissolving crude sodium chloride such as rock salt in the presence of the polyphosphoric acid compound. I prefer to do this by dissolving the crude sodium chloride either in water containing the polyphosphate compounds or alternatively by adding the polyphosphoric acid compounds to the crude sodium chloride prior to the addition of water to form a brine. In other words, it is essential that the polyphosphate materials be present during the process of dissolution of the sodium chloride from the crude salt mass which contains the undesirable impurities present therein so that the solution of these undesirable impurities is retarded or prevented. I prefer to add the polyphosphate materials to the water employed for the sodium chloride dissolving operation since the polyphosphate is more uniformly distributed than it could possibly be if it were mixed in dry form with the crude rock salt.

It is interesting to note that if I add the polyphosphate compounds of this invention to a sodium chloride brine after it has been prepared by dissolving rock salt or other crude salt in water, there is virtually no effect whatever in reducing the total amount of impurities present in the brine. By first adding the polyphosphate compounds to the dissolution water or to the crude salt itself, the mineral anhydrite which is the chief impurity in the crude salt, seems to be hindered from dissolving except to an extremely limited extent with the resulting brine having a purity which is in the neighborhood of 99.9% and even higher in terms of reconverted sodium chloride. While I am unable to describe precisely the chemical and/or physical effect of the polyphosphates upon the anhydrite, there probably is an adsorption of a portion or all of the polyphosphate molecule upon the surface of the anhydrite crystals thereby effectively insulating them from the dissolving action of the water.

While virtually any concentration of the above-described polyphosphate compounds is effective in carrying out my process, in general I have found that a concentration of about 50 parts per million to about 100 parts per million of phosphate compound based on the weight of dissolution water combines effectiveness with economy to a high degree. However, amounts as small as 1 or 2 parts per million of certain polyphosphates to as high as 1000 or even 2000 parts per million or more may be used depending upon the particular conditions and quality of sodium chloride brine desired.

At the outset, in some of the tests for determining the effectiveness of my process, I used a Michigan rock salt (commonly designated in the industry as "Detroit Salt") which has the following average composition:

| | Percent by weight |
|---|---|
| Acid insoluble as silica ($SiO_2$) | 0.031 |
| Iron oxide ($Fe_2O_3$) | 0.008 |
| Magnesium chloride ($MgCl_2$) | 0.050 |
| Magnesium carbonate ($MgCO_3$) | 0.018 |
| Calcium chloride ($CaCl_2$) | 0.055 |
| Calcium carbonate ($CaCO_3$) | 0.065 |
| Calcium sulfate ($CaSO_4$) | 1.517 |
| Water | 0.183 |
| Sodium chloride (NaCl) by difference | 98.073 |

To prepare a saturated brine I used a ratio of three parts of rock salt to seven parts of distilled water, adding the rock salt to the dissolution water containing my preferred polyphosphate compounds and agitating for a two-hour dissolving period with a motor-driven stirrer. Brine samples were taken at one and two hour intervals and filtered immediately through a No. 42 Whatman filter paper to eliminate insoluble and undissolved soluble impurities. The test solutions were analyzed for sulfate ($SO_4$) using a modified turbidimetric method to eliminate interference with chloride and polyphosphate concentrations. Test brines containing polyphosphate were treated with acid and boiled to hydrolyze polyphosphate to orthophosphate prior to evaluation with the turbidimetric method using a Fisher electrophotometer.

In the rock salt dissolving water I used for these tests, I first dissolved combinations of sodium hydroxide (NaOH)-sodium metaphosphate mixtures, sodium hydroxide-tetra sodium pyrophosphate mixtures, and sodium hydroxide-sodium metaphosphate-tetra sodium pyrophosphate mixtures. The concentration of polyphosphate in each case was in the range from about 50 to about 1000 parts per million and the concentration of sodium hydroxide in the range of from about 15 parts per million to about 50 parts per million, all concentrations being based upon the weight of dissolving water. In addition, a control test using plain distilled water for simulating the dissolving of rock salt without the benefit of my method was also carried out. Sodium hydroxide was used in this particular test to determine whether or not the alkalinity of the dissolving water had any appreciable effect upon the success of the dissolving process.

The data obtained from this experiment is summarized herewith in Table I:

TABLE I

*Effect of polyphosphate and NaOH concentration on the solubility of calcium sulfate*

[Saturated Detroit rock salt brine—room temperature—agitation.]

| Inhibitor conc. (dissolving water) polypohosphate | NaOH, p.p.m. | pH | Sulfate ($SO_4$), mg/l. 1 hr. | Sulfate ($SO_4$), mg/l. 2 hrs. | Percent reduction $SO_4$, 1 hr. |
|---|---|---|---|---|---|
| 0 | 0 | 7.4 | 910 | 1,178 | |
| 0 | 15 | 8.8 | 800 | 1,084 | 12 |
| 0 | 30 | 9.4 | 766 | 942 | 16 |
| 50 p.p.m. Calgon [1] | 50 | 9.7 | 150 | | 84 |
| 50 p.p.m. $Na_4P_2O_7$ | 50 | 9.7 | 200 | | 78 |
| 100 p.p.m. Calgon | 15 | 8.5 | 131 | 145 | 86 |
| 200 p.p.m. Calgon | 30 | 9.35 | 80 | 101 | 91 |
| 200 p.p.m. $Na_4P_2O_7$ | 30 | 9.5 | 65 | 69 | 93 |
| 500 p.p.m. Calgon | 50 | 9.5 | 54 | 72 | 94 |
| 500 p.p.m. $Na_4P_2O_7$ | 50 | 9.8 | 39 | 63 | 96 |
| 250 p.p.m. Calgon, 250 p.p.m. $Na_4P_2O_7$ | 50 | 9.5 | 56 | 60 | 94 |
| 1,000 p.p.m. Calgon | 50 | 8.5 | 76 | 80 | 92 |
| 1,000 p.p.m. $Na_4P_2O_7$ | 50 | 9.85 | 41 | 54 | 96 |

[1] "Calgon" is a trade-name for a commercial sodium metaphosphate having a molar ratio of $Na_2O$ to $P_2O_5$ of 1:1 to 1.

A comparison of the one hour results for the control sample and the samples containing no phosphate but 15 p.p.m. of sodium hydroxide in one case and 30 p.p.m. in a second case indicate that as the brine pH is raised from pH 7.4 to pH 9.4, the surfate content of the brine was reduced by about 16%. On the other hand, the polyphosphates are considerably more effective than sodium hydroxide in inhibiting the solubility of calcium sulfate particularly when the pH value of the brine is increased by adding small amounts of alkaline agents or by using alkaline reacting polyphosphates.

I have found that the calcium sulfate inhibitive power of the polyphosphates approaches its maximum effect at concentrations of polyphosphate which are about 500 p.p.m. based on the weight of dissolving water and that the sodium hexametaphosphate (Calgon) is more effective than tetrasodium pyrophosphate below concentrations of about 60–70 p.p.m. and slightly less effective than the tetrasodium pyrophosphate at the higher concentrations. When these polyphosphates are used at concentrations of several hundred parts per million, the tetrasodium pyrophosphate has an added advantage over the sodium metaphosphate presumably because of the higher alkalinity of the pyrophosphate.

To determine the effectiveness of my methods using the polyphosphates to retard the solution of anhydrite in the preparation of sodium chloride brines under practical conditions, I carried out a plant trial using a standard 24 inch diameter, down flow rock salt dissolver. The rate of water flow was regulated to give saturated brine flow rates of approximately 150 gallons per hour, 50 gallons per hour, and 16.7 gallons per hour. These brine rates were checked at regular intervals by measuring the time in seconds required to fill a standard five gallon or quart container and corrections in water flow made if required. The rated capacity of this particular dissolving unit which I used was 40 gallons of brine per hour. "Detroit" type rock salt and Detroit municipal water were used in the preparation of the brine. Total hardness of the Detroit municipal water supply was determined as 91 to 93 p.p.m. (as calcium carbonate) with the sulfate ($SO_4$) content of the water 16 to 17 p.p.m. and the pH of the water was 7.6. Water temperatures during the test run were in the neighborhood of 40 to 45° F.

A screen analysis of the rock salt used in this test showed the following breakdown:

Percent

| | |
|---|---|
| On No. 4 screen | 23.9 |
| On No. 8 screen | 48.9 |
| On No. 10 screen | 9.8 |
| On No. 12 screen | 8.5 |
| On No. 16 screen | 6.7 |
| Passing No. 16 screen | 2.2 |

A chemical analysis of a composite sample of this rock salt which I used shows the following composition:

Percent by weight

| | |
|---|---|
| Water insoluble | 0.111 |
| Magnesium chloride ($MgCl_2$) | 0.033 |
| Calcium chloride ($CaCl_2$) | 0.032 |
| Calcium Sulfate ($CaSO_4$) | 1.555 |
| Water | 0.149 |
| Sodium chloride (NaCl) by difference | 98.120 |

In the tests where polyphosphate was added to the rock salt dissolving water, the water service inlet pipe to the dissolver was tapped and a concentrated polyphosphate stock solution was proportioned into the dissolving water by means of a standard chemical feed pump. The polyphosphate composition which I used to prepare the stock solution for addition to the dissolving water was a mixture of equal parts by weight of commercial sodium hexametaphosphate (molar ratio of $Na_2O$ to $P_2O_5$ of about 1.1:1) and anhydrous tetrasodium pyrophosphate. The chemical feed pump was calibrated and set to deliver to the dissolving water continuously and proportionately an amount of stock solution equivalent to 100 p.p.m. of the dry polyphosphate mixture based on the weight of water.

In these plant tests, separate runs were carried out in the absence of and in the presence of polyphosphate in the dissolving water. In each case the test conditions were maintained as nearly constant as possible so that the test data are directly comparable. These parallel runs represent 22.25 hours at a saturated brine production rate of 150 gallons per hour, 4 hours at 50 gallons per hour, and a minimum of 2.7 hours at 16.7 gallons per hour.

An examination of the results of these practical tests shown in Table II clearly indicates a confirmation of laboratory observations that polyphosphates are extremely effective in the production of pure sodium chloride brine from crude rock salt. In the plant scale operation, calcium sulfate ($CaSO_4$) concentrations in saturated brine prepared at 150 gallons per hour, 50 gallons per hour, and 16.7 gallons per hour were reduced 86 to 90% where approximately 100 p.p.m. of the polyphosphate compound mixture was present in the dissolving water. It will be noted that in general the rate of brine production appears to influence the quality of the brine to a marked extent. The faster the flow rate through the dissolver, the lower the calcium sulfate content found in the brine. This is to be expected since contact time with the anhydrite which is the major impurity appears to be an important factor. It will be noted, however, that on a percentage of improvement basis, the polyphosphate additive is as effective at slow rates of brine flow as at the faster rates. Furthermore, even at the slowest rate of brine production with water containing the polyphosphate, brines of much greater purity were obtained than those from the most rapid rate of production using plain water.

TABLE II

*Plant-scale pure brine production test*

[Grams CaSO₄/liter of saturated brine]

BRINE FLOW RATE—150 GAL./HR.

| Time | Control (plain water) | Water with polyphosphate added |
|---|---|---|
| 1 hour | 0.82 | 0.11 |
| 5 hours | 1.08 | 0.12 |
| 10 hours | 1.21 | 0.12 |
| 15 hours | 1.28 | 0.13 |
| 20 hours | 1.31 | 0.14 |

BRINE FLOW RATE—50 GAL./HR.

| 15 minutes | 1.50 | 0.16 |
|---|---|---|
| 30 minutes | 1.70 | 0.17 |
| 1 hour | 1.90 | 0.18 |
| 2 hours | 1.93 | 0.20 |

BRINE FLOW RATE—16.7 GAL./HR.

| 15 minutes | 2.0 | 0.26 |
|---|---|---|
| 30 minutes | 2.1 | 0.29 |
| 1 hour | 2.36 | 0.32 |
| 2 hours | 2.65 | 0.32 |
| 3 hours | 2.70 | 0.32 |

To determine the effectiveness of a slowly soluble type of glassy phosphate in the preparation of salt brine having a high degree of purity, I carried out a test using a sodium-calcium phosphate glass which was made in the conventional manner according to the teachings of U.S. Patents 2,539,305 and 2,601,395, both of which issued on applications filed by George B. Hatch. The particular phosphate which I employed in my test contained about 68% phosphorus pentoxide, 15½% calcium oxide and 16½% sodium oxide. I prepared 750 ml. of a distilled water solution containing 100 p.p.m. of the slowly soluble phosphate mentioned above and dissolved 250 grams of crude "Detroit" rock salt at room temperature with stirring of the solution during and following the addition. For comparison purposes I prepared a control brine by adding 250 grams of crude "Detroit" rock salt to 750 ml. plain distilled water at room temperature with stirring of the solution during and following the addition. After two hours I noted that the pH of the sample of brine which contained polyphosphate was about 6.0 while the pH of the control brine was about 7.3.

In the following table appear the data obtained from this specific test:

TABLE III

*Effect of slowly soluble type polyphosphate glass on solubility of calcium sulfate in 25% rock salt brine*

| Elapsed time (min.) | Sulfate (SO₄) content mg/l. brine | | Percent reduction of Sulfate (SO₄) |
|---|---|---|---|
| | Plain water control | 100 p.p.m. polyphosphate in dissolving water | |
| 15 | 640 | 157 | 76 |
| 30 | 812 | 160 | 80 |
| 60 | 1,022 | 220 | 78 |
| 120 | 1,240 | 265 | 79 |

It will be obvious to those skilled in the art that the essence of my invention is the dissolving of the crude sodium chloride which contains calcium sulfate as a principal impurity in such a way that the impurity is held back or inhibited from dissolving. Thus it will appear feasible as has been stated heretofore to either add my preferred polyphosphate materials to the dissolving water or conversely to mix the crude impure salt with the polyphosphate so that the user of the salt may add plain water to the polyphosphate-rock salt mixture and obtain the same result. A further use for my process contemplates the addition of my preferred polyphosphates to the dissolving water which is employed underground to prepare a brine which is subsequently returned to the surface of the earth for industrial consumption or for other use. It has heretofore been impracticable to purify brines made by dissolving salt underground since the methods of purification all involved precipitation of calcium compounds, e.g. calcium carbonate or calcium phosphate, etc. with the resultant plugging of pipelines, screens, etc. Since my polyphosphate additives when used in accordance with my preferred methods do not precipitate calcium compounds, these difficulties are completely obviated.

Furthermore, I may use the polyphosphates of my invention to retard the solution of calcium sulfate when a non-saturated sodium chloride brine is recycled to a rock salt dissolver for restrengthening. In this case, I may add the polyphosphate to the original dissolving water and later, to a recycling non-saturated brine, for example an electrolytic cell brine which may contain caustic soda, hydrochloric acid, or other electrolysis products, such as chlorates or hypochlorites.

While the brines prepared in the laboratory experiments shown herein were made at room temperature for convenience, I may carry out my processes of dissolving the impure sodium chloride over a wide temperature range. Generally of course, it is preferable to dissolve the salt at those temperatures which normally prevail under the particular conditions encountered.

I have found that contrary to the practices of the prior art, where alkaline materials must be added to certain dissolving waters to raise their pH value above neutrality (7.0) and preferably into the definitely alkaline range to obtain satisfactory results, I can prepare brines of high purity at pH values below neutrality. Heretofore such conditions had to be avoided if a brine low in calcium sulfate was desired. This was especially true in the pH range below 600. Obviously the addition of alkaline materials to adjust the pH value upward may not only require careful control but also may introduce certain undesirable ions into the brine which later must be removed by one or more costly processes.

I have been able to prepare brines of acceptable purity at pH values (of the finished brine) as low as 2.0 although the amount of calcium sulfate dissolved in the brine is somewhat greater than when I maintain a pH value of about 5.0 or more. I have made brines quite low in calcium sulfate at brine pH values in the range of 5.0 to 6.5. I illustrate the effectiveness of my process at pH values below 7.0 with the following data:

TABLE IV

*Effect of polyphosphates in 25% "Detroit" rock salt brine at pH values below 7.0*

TWO-HOUR TEST—WITH STIRRING

| Additive to dissolving water | Brine, pH | Sulfate (SO₄) in brine, mg./liter | Percent reduction in sulfate |
|---|---|---|---|
| None | 7.3 | 1,240 | |
| 100 p.p.m. Calgon [1] | 5.6 | 287 | 76.8 |
| 100 p.p.m. Na₄P₂O₇ | 6.5 | 220 | 82.4 |
| 100 p.p.m. Na₅P₃O₁₀ | 6.2 | 484 | 61.0 |

SIXTEEN-HOUR TEST—WITH STIRRING

| | | | |
|---|---|---|---|
| None | 7.1 | 2,412 | |
| 2 p.p.m. Calgon | 6.3 | 1,790 | 26 |
| 5 p.p.m. Calgon | 6.1 | 1,208 | 50 |
| 12.5 p.p.m. Calgon | 6.0 | 817 | 66 |
| 25 p.p.m. Calgon | 6.0 | 715 | 70 |
| 50 p.p.m. Calgon | 6.2 | 570 | 76 |
| 100 p.p.m. Calgon | 6.2 | 535 | 78 |
| 25 p.p.m. $Na_4P_2O_7$ | 6.5 | 1,054 | 56 |
| 50 p.p.m. $Na_4P_2O_7$ | 6.5 | 605 | 75 |
| 100 p.p.m. $Na_4P_2O_7$ | 6.5 | 321 | 87 |

[1] Calgon is the brand name for a glassy sodium polyphosphate having a molar ratio of $1.1Na_2O$ to $1P_2O_5$.

While my invention is particularly useful in the preparation of pure brines for industrial consumption, it is not my intention to limit myself to this single application of the process. I may employ the process to good advantage in one or more of the many uses of crude sodium chloride where it is considered desirable or necessary to retard the dissolving of calcium sulfate or other impurities which are present in the crude salt.

It will also be obvious to those skilled in the art that pure brine prepared by my process may be employed in various industrial processes to great advantage and that I may vary the degree of purity depending upon the tolerance of impurities which a particular use will permit. For example, the degree of brine purity will be considerably higher when the brine is to be employed in the manufacture of metallic sodium than it might be in the manufacture of soda ash by the ammonia-soda process or the manufacture of chlorine and caustic soda by the various electrolytic processes now in use. I may use my process in combination with other methods of purification, as for example I may first employ polyphosphates in the production of a brine and follow with the use of a barium salt, etc.

While there has been described an embodiment of the invention, the methods described are not intended to be understood as limiting the scope of the invention as it is realized that alterations and changes are possible. It is further intended that each element recited in any of the following claims is to be understood as referring to all equivalent elements for accomplishing substantially the same results in substantially the same or equivalent manner, it being intended to cover the invention broadly in whatever form its principle may be utilized.

Having thus described my invention, what I claim as new and desire to be covered by Letters Patent is:

1. The method of preparing a sodium chloride brine of exceptional purity from solid sodium chloride contaminated by calcium sulfate which comprises dissolving the contaminated sodium chloride in water at a pH value above about 2.0 in the presence of polyphosphate compounds selected from the group consisting of alkali metal polyphosphates, alkaline earth metal polyphosphates, ammonium polyphosphates, and acid polyphosphates and mixtures thereof, in an amount which is from about 1 part polyphosphate per million parts of water to about 2000 parts polyphosphate per million parts of water.

2. The method as described in claim 1 where the polyphosphate compound is an alkali metal polyphosphate having a molar ratio of alkali metal to phosphorus pentoxide of from about 0.9 to 1 to about 2 to 1.

3. The method as described in claim 1 where the polyphosphate compound is a sodium polyphosphate having a molar ratio of $Na_2O$ to $P_2O_5$ of from about 0.9 to 1 to about 2 to 1.

4. The method as described in claim 1 where the polyphosphate compound is a glassy fusion product consisting of the oxides MO, AMO, and $P_2O_5$, where MO is a metal oxide and AMO is an alkali metal oxide.

5. The method as described in claim 1 in which the polyphosphate compound is a mixture of a sodium phosphate glass having a molar ratio of $Na_2O$ to $P_2O_5$ of about 1.1 to 1 and crystalline sodium pyrophosphate, $Na_4P_2O_7$, and in which the concentration of said polyphosphate mixture is from about 25 parts per million to about 100 parts per million based on the weight of the water.

6. The method of preparing a sodium chloride brine which is substantially uncontaminated by calcium sulfate, which comprises contacting solid sodium chloride, already contaminated by calcium sulfate, with water at a pH value above about 2.0 in the presence of water soluble polyphosphate compounds selected from the group consisting of alkali metal polyphosphates, alkaline earth metal polyphosphates, acid polyphosphates, and ammonium polyphosphates in amounts ranging from about 1 to 2000 parts per million parts of water, to inhibit the dissolution of calcium sulfate in the brine, and removing the thus substantially uncontaminated sodium chloride brine from the undissolved calcium sulfate.

7. The method as described in claim 6 where the polyphosphate compound is an alkali metal polyphosphate having a molar ratio of alkali metal to phosphorus pentoxide of from about 0.9 to 1 to about 2 to 1.

8. The method as described in claim 6 where the polyphosphate compound is a sodium phosphate having a molar ratio of $Na_2O$ to $P_2O_5$ of from about 0.9 to 1 to about 2 to 1.

9. The method as described in claim 6 where the polyphosphate is a glassy fusion product consisting of the oxides MO, AMO, and $P_2O_5$, where MO is a metal oxide and AMO is an alkali metal oxide.

10. The method of preparing a sodium chloride brine of exceptional purity from solid sodium chloride contaminated by calcium sulfate which comprises dissolving the contaminated sodium chloride in water at a pH value above about 2.0 in the presence of polyphosphate compounds selected from the group consisting of alkali metal polyphosphates, alkaline earth metal polyphosphates, ammonium polyphosphates, and acid polyphosphates, and mixtures thereof, in an amount which is from about 1 part polyphosphate per million parts of water to about 2000 parts polyphosphate per million parts of water, dissolving said sodium chloride until a brine having the desired concentration of sodium chloride is obtained, and removing the thus substantially pure sodium chloride brine from the undissolved contaminating calcium sulfate.

11. The method as described in claim 10 wherein the aqueous solution employed in contacting the contaminated sodium chloride contains from about 50 parts per million to about 100 parts per million of polyphosphate compound based on the weight of the aqueous solution.

12. The method as described in claim 10 wherein the aqueous solution employed in contacting the contaminated sodium chloride contains from about 25 parts per million to about 50 parts per million of polyphosphate compound based on the weight of the aqueous solution.

13. The method as described in claim 10 wherein the aqueous solution employed in contacting the contaminated sodium chloride contains from about 200 parts per million to about 2000 parts per million of polyphosphate compound based on the weight of the aqueous solution.

14. The method of preparing a sodium chloride brine of exceptional purity from solid sodium chloride contaminated by calcium sulfate which comprises dissolving the contaminated sodium chloride in water at a pH value above about 2.0 in the presence of polyphosphate compounds selected from the group consisting of alkali metal polyphosphates, alkaline earth metal polyphosphates, ammonium polyphosphates, and acid polyphosphates and mixtures thereof, in an amount which is from about 1 part polyphosphate per million parts of water to about 2000 parts polyphosphate per million parts of water, to prevent the major portion of the calcium sulfate from being dissolved during the contacting of the primary constituents, and thereafter removing the substantially pure brine from the residual undissolved calcium sulfate.

15. The method described in claim 14 in which the polyphosphate compound is a sodium polyphosphate having a molar ratio of $Na_2O$ to $P_2O_5$ of from about 0.5 to 1 to about 2 to 1 and in which the concentration of said polyphosphate is from about 2 parts per million to about 2000 parts per million based on the weight of water.

16. The method as described in claim 14 in which the polyphosphate compound is an alkali-metal phosphate having a molar ratio of alkali metal to phosphorus pentoxide of from about 0.5 to 1 to about 2 to 1.

17. The method as described in claim 14 in which the polyphosphate compound is a glassy fusion product consisting of the oxides MO, AMO, and $P_2O_5$ where MO is a metal oxide and AMO is an alkali metal oxide.

18. The method of preparing a substantially pure sodium chloride brine from solid sodium chloride contaminated by impurities including sulfates, and other calcium and magnesium compounds, which comprises contacting the sodium chloride with an aqueous solution having a pH value above about 2.0 and containing in solution from about 2 parts per million to about 2000 parts per million by weight of a relatively slowly soluble water soluble polyphosphate compound, said compound being a glassy fusion product consisting of the oxides MO, AMO, and $P_2O_5$, where MO is a metal oxide and AMO is an alkali metal oxide, dissolving said sodium chloride until a brine having the desired concentration of sodium chloride is obtained, and thereafter removing the substantially pure sodium chloride brine from the undissolved contaminating impurities including sulfates and other calcium and magnesium compounds.

19. The method as described in claim 18 where the polyphosphate compound is a homogeneous glassy fusion product consisting analytically of the oxides $Na_2O$, CaO, and $P_2O_5$, the $P_2O_5$ being present to the extent of about 50 mol percent, the $Na_2O$ being present to the extent of from about 16 mol percent to about 33 mol percent, and the CaO being present to the extent of from about 33 mol percent to about 16 mol percent.

20. The method of preparing a sodium chloride brine of exceptional purity from solid sodium chloride contaminated by calcium sulfate which comprises dissolving the contaminated sodium chloride in water in the presence of a polyphosphate compound consisting of the oxides MO, AMO, and $P_2O_5$ where MO is a metal oxide and AMO is an alkali metal oxide in an amount which is from about 2 parts polyphosphate per million parts of water to about 50 parts polyphosphate per million parts of water.

References Cited in the file of this patent

UNITED STATES PATENTS

| | | |
|---|---|---|
| 2,108,783 | Smith | Feb. 15, 1938 |
| 2,128,161 | Morgan | Aug. 23, 1938 |
| 2,433,601 | Comstock | Dec. 30, 1947 |

UNITED STATES PATENT OFFICE
CERTIFICATE OF CORRECTION

Patent No. 2,906,599                                          September 29, 1959

Charles T. Roland

It is hereby certified that error appears in the printed specification of the above numbered patent requiring correction and that the said Letters Patent should read as corrected below.

Column 10, line 45, for "range below 600." read -- range below 6.0. --.

Signed and sealed this 22nd day of March 1960.

(SEAL)
Attest:

KARL H. AXLINE                                      ROBERT C. WATSON
Attesting Officer                                  Commissioner of Patents